(12) United States Patent
Polzin et al.

(10) Patent No.: US 7,890,138 B2
(45) Date of Patent: Feb. 15, 2011

(54) MECHANISM FOR REMOTELY ACCESSING A PORTABLE COMPUTER INCLUDING WIRELESS COMMUNICATION FUNCTIONALITY

(75) Inventors: R. Stephen Polzin, San Jose, CA (US); William T. Edwards, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 1265 days.

(21) Appl. No.: 11/478,771

(22) Filed: Jun. 30, 2006

(65) Prior Publication Data

US 2008/0004013 A1 Jan. 3, 2008

(51) Int. Cl.
*H04B 1/38* (2006.01)
(52) U.S. Cl. ..................................................... 455/557
(58) Field of Classification Search ................. 455/557, 455/73, 435.1, 550.1
See application file for complete search history.

(56) References Cited

U.S. PATENT DOCUMENTS

| | | | |
|---|---|---|---|
| 4,890,282 A * | 12/1989 | Lambert et al. | 370/254 |
| 5,524,134 A * | 6/1996 | Gustafson et al. | 455/410 |
| H1920 H * | 11/2000 | Xu et al. | 455/403 |
| 6,144,336 A * | 11/2000 | Preston et al. | 342/357.09 |
| 6,363,249 B1 * | 3/2002 | Nordeman et al. | 455/418 |
| 6,415,021 B1 * | 7/2002 | Oh | 379/88.13 |
| 6,494,762 B1 | 12/2002 | Bushmitch | |
| 6,606,611 B1 * | 8/2003 | Khan | 706/10 |
| 6,622,018 B1 * | 9/2003 | Erekson | 455/420 |
| 6,779,019 B1 | 8/2004 | Mousseau | |
| 6,801,755 B2 * | 10/2004 | Kardach et al. | 455/41.2 |
| 6,961,410 B1 * | 11/2005 | Castagna | 379/88.23 |
| 7,058,829 B2 | 6/2006 | Hamilton | |
| 7,076,066 B2 * | 7/2006 | Keith | 380/270 |
| 7,095,708 B1 * | 8/2006 | Alamouti et al. | 370/208 |
| 2001/0034843 A1 * | 10/2001 | Hess | 713/201 |
| 2002/0019246 A1 * | 2/2002 | Forte | 455/555 |
| 2002/0032875 A1 * | 3/2002 | Kashani | 713/300 |
| 2002/0061761 A1 * | 5/2002 | Maggenti et al. | 455/518 |
| 2002/0181398 A1 * | 12/2002 | Szlam | 370/230 |
| 2004/0038667 A1 * | 2/2004 | Vance, Jr. | 455/410 |
| 2004/0077334 A1 * | 4/2004 | Joyce et al. | 455/406 |
| 2005/0090235 A1 * | 4/2005 | Vermola et al. | 455/414.3 |

(Continued)

OTHER PUBLICATIONS

"Enabling Notebook Users with Wide-Area Broadband Access;" QUALCOMM Incorporated, Sep. 2005, http://www.qualcomm.com/common/documents/white_papers/Embedded_CDMANotebook.pdf.

*Primary Examiner*—Lester Kincaid
*Assistant Examiner*—Nathan Mitchell
(74) *Attorney, Agent, or Firm*—Meyertons, Hood, Kivlin, Kowert & Goetzel, P.C.; Stephen J. Curran (57) ABSTRACT

A portable computer system such as a laptop computer system includes a computing subsystem that includes a processor that may execute instructions that implement application software, and a storage coupled to the processor that may store information. The laptop computer system also includes a wireless subsystem that may communicate with a wireless network. In addition, the wireless subsystem may receive an incoming communication and determine whether a requesting user is an authorized user. The processor may retrieve at least a portion of the information from the storage and send the retrieved information to a destination via email, for example, in response to a request by the requesting user for the information.

20 Claims, 3 Drawing Sheets

U.S. PATENT DOCUMENTS

| | | | |
|---|---|---|---|
| 2005/0100142 A1* | 5/2005 | Gandhi et al. | 379/88.01 |
| 2005/0136949 A1* | 6/2005 | Barnes, Jr. | 455/461 |
| 2005/0187937 A1* | 8/2005 | Kawabe et al. | 707/9 |
| 2006/0083208 A1* | 4/2006 | Lin | 370/338 |
| 2006/0199566 A1* | 9/2006 | Jang et al. | 455/411 |
| 2007/0061845 A1* | 3/2007 | Barnes, Jr. | 725/62 |

* cited by examiner

MECHANISM FOR REMOTELY ACCESSING A PORTABLE COMPUTER INCLUDING WIRELESS COMMUNICATION FUNCTIONALITY

BACKGROUND OF THE INVENTION

1. Field of the Invention

This invention relates to portable computing systems and, more particularly, to remote access of portable computing systems via wireless telephony.

2. Description of the Related Art

Since the introduction of personal computing machines, portability of the computing environment has been in demand. As the computing power and speed of the processors that drive the computing platforms has increased so has the demand for this portability. However, there are some drawbacks to portable computing platforms. For example, once a conventional portable computer is disconnected from a network, the information stored on that portable computer is typically inaccessible.

SUMMARY

Various embodiments of a mechanism for remotely accessing a portable computer system such as a laptop computer are disclosed. In one embodiment, the laptop computer system includes a computing subsystem that includes a processor that may execute instructions that implement application software and a storage coupled to the processor that may store information. The laptop computer system also includes a wireless subsystem that may communicate with a wireless network such as a wireless telephone network, for example. In addition, the wireless subsystem may receive an incoming communication such as call or datagram, and determine whether the call or datagram is from an authorized user. The processor may retrieve at least a portion of the information from the storage and send the at least a portion of the information to a destination via email, for example, in response to a request by the requesting user for the at least a portion of the information.

In one specific implementation, the processor may retrieve the at least a portion of the information if it has been determined that the requesting user is an authorized user. Alternatively, the processor may terminate the telephone call and retrieve no information if it has been determined that the requesting user is not an authorized user.

In another implementation, the wireless subsystem may identify whether a requesting user is an authorized user using voice recognition.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. It is noted that the word "may" is used throughout this application in a permissive sense (i.e., having the potential to, being able to), not a mandatory sense (i.e., must).

DETAILED DESCRIPTION

Figure 1:
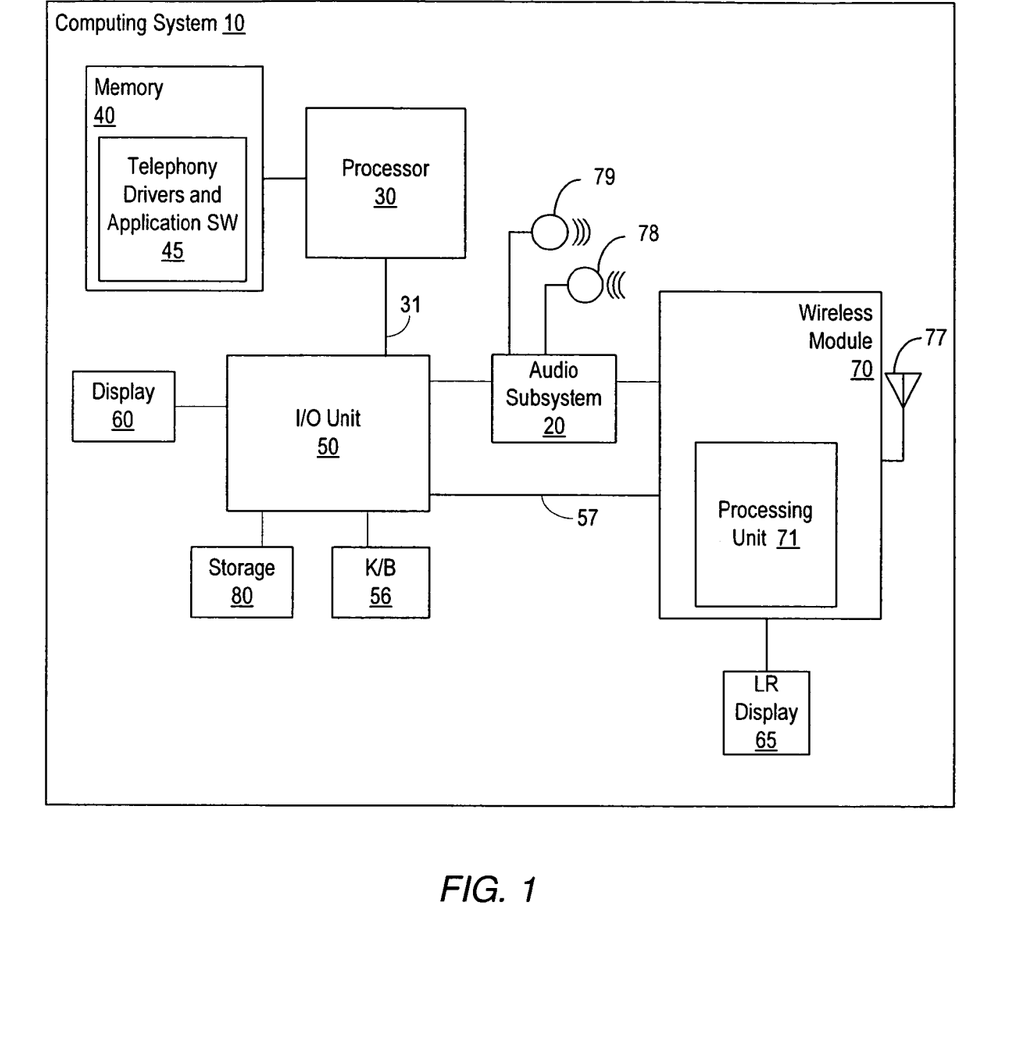
FIG. 1 is a block diagram of one embodiment of a portable computer system including wireless telephony and server functionality.

Turning now to FIG. 1, a block diagram of one embodiment of a portable computer system including wireless functionality is shown. Portable computer system 10 includes a processor 30 coupled to a memory 40 and to an input/output (I/O) unit 50. I/O hub 50 is coupled to various I/O devices such as a display 60, a storage device 80, a keyboard 56, and a wireless module 70. Wireless module 70 is coupled to a low-resolution display 65, and a power management unit 90. In addition, an audio subsystem 20 is coupled between I/O unit 50 and wireless module 70.

It is noted that computer system 10 may include various other components and circuits that have been omitted for simplicity. It is further noted that the components of the computing subsystem are depicted in FIG. 1 for illustrative purposes. It is contemplated that the functionality associated with the various components may be distributed differently such that the lines between blocks may be drawn differently. Moreover, it is entirely possible that the functionality shown in FIG. 1 may be implemented on a single integrated circuit chip, such a system on a chip (SOC) implementation, as desired.

In the illustrated embodiment, processor 30 may be illustrative of a microprocessor that implements the x86 architecture. Although in other embodiments, processor 30 may be any type of processor implemented with any type of architecture. In one embodiment, processor 30 may include a memory controller (not shown) to facilitate memory transactions directed to memory 40, for example. In addition, processor 30 may include various interface circuits such as a host interface (not shown) for controlling transactions with I/O unit 50.

I/O unit 50 may be any of a variety of I/O controllers that may include bridging and graphics circuits (not shown) that may be used as interfaces between processor 30 and the various I/O devices and buses to which it is coupled. For example, in one embodiment, I/O unit 50 may be coupled to processor 30 via a HyperTransport™ link 31. In such an embodiment, I/O unit 50 may include one or more Hyper-Transport™ to peripheral component interconnect (PCI) and/or a HyperTransport™ to universal serial bus (USB) bridges for connection to PCI and USB devices, respectively, for example. In addition, in one embodiment, I/O unit 50 may be coupled to wireless module 70 via a USB, HyperTransport™ or other type of link 57, although other interconnects are contemplated. Further, I/O unit 50 may include and graphics functionality for generation of the various signals used in association with display 60 and LR display 65, for example.

It is noted that although I/O unit 50 is coupled to processor 30 via a link such as a HyperTransport™ link, for example, it is contemplated that in other embodiments, processor 30 may be coupled to the components of the system using a more traditional system architecture. For example, processor 30 may be coupled to a bus bridge (not shown) such as a Northbridge via shared bus arrangement (e.g., front side bus (FSB)). In addition, a separate bus bridge such as a South-bridge (not shown) may be coupled to the Northbridge for coupling to various other peripheral devices (e.g., storage 80, KB 56, etc.). In such embodiments, wireless module 70 may be coupled to the Northbridge via any type of link such as a USB link, for example.

The audio subsystem 20 may include audio functionality including analog-to-digital and digital to-analog circuits for generation of the various signals associated with microphone 79 and speaker 78, for example.

Storage 80 may be a mass storage device. For example, in one embodiment storage 80 may include one or more hard disk drives. In other embodiments, storage 80 may include other types of storage media such as a non-volatile random access memory (RAM) device (e.g., a memory stick, or flash drive), compact disk (CD) drive, digital video disk (DVD) drive, tape drive, floppy drive, and the like.

In one embodiment, display 60 may be a liquid crystal display (LCD) or other types of displays such as may be common to portable laptop and notebook computers. In contrast, LR display 65 may be an LCD display such as the type of display used on a mobile telephone or a personal digital assistant (PDA) for example. In one embodiment, LR display 65 may have a lower resolution than display 60. As will be described in greater detail below, in some modes of operation of portable computer system 10, LR display 65 may be used exclusively, while in other modes, display 60 may be used exclusively, and in still other modes, both displays may used concurrently.

As shown, wireless module 70 is coupled to an antenna 77, although in other embodiments, multiple antennas may be used. Wireless module 70 includes a processing unit 71 and a memory 72. Wireless module 70 may include the functionality of a wireless communication device such as a mobile telephone, for example. As such, in one embodiment, processing unit 71 may execute instructions and perform functions, and may include analog, digital, radio frequency (RF) and baseband circuits (not shown) that may function to perform such tasks as RF signal reception and transmission, up-conversion and down-conversion of the RF signals, analog-to-digital conversion, digital-to-analog conversion, digital signal processing of the baseband signals, as well as monitoring and control functions. Accordingly, in various implementations, processing unit 71 may include hardware that includes a separate processor such as an advanced RISC machine (ARM) processor, for example, a digital signal processing unit, and/or one or more hardware accelerators for handling complex algorithms such as encryption and decryption. It is noted that memory 72 may be any type of memory including volatile memory such as RAM, or non-volatile memory such as Flash memory or read only memory (ROM), among others, for example.

As mentioned above, wireless module 70 may communicate with a wireless network, such as a wireless telephone network, for example. The wireless network may conform to any of a variety of communication standards that may be compatible with various technologies such as the second (2G), third (3G) and fourth (4G) generation mobile phone technologies. In addition, the wireless network may be a wireless wide area network implemented to be compatible with such protocols as WiMax, WiBro, NextNet, and others. More particularly, in various embodiments, wireless module 70 may employ a time-division multiple access (TDMA), a code division multiple access (CDMA) and/or a wideband CDMA (WCDMA) technique to implement standards such as the Global System for Mobile Communications (GSM) standard, the Personal Communications Service (PCS) standard, and the Digital Cellular System (DCS) standard, for example. In addition, many data transfer standards that work cooperatively with the various technology platforms may also be supported. For example, wireless module 70 may also implement the General Packet Radio Service (GPRS) standard, the Enhanced Data for GSM Evolution (EDGE) standard, which may include Enhanced General Packet Radio Service standard (E-GPRS) and Enhanced Circuit Switched Data (ESCD), and the high speed circuit switched data (HSCSD) standard, high speed downlink packet access (HSDPA), high speed uplink packet access (HSUPA), evolution data optimized (EV-DO), among others.

In one embodiment, memory 40 may be a system memory that is used to store instructions and data that may be used by processor 30 as well as other devices (e.g., I/O unit 50). In various embodiments, memory 40 may be implemented using any of a variety of volatile or non-volatile memory devices. For example, memory 40 may be implemented using any number of memory devices in the dynamic RAM family of devices. In one embodiment, memory 40 may be implemented using removable or non-removable memory modules with the memory devices affixed thereto. However, other memory device configurations are possible and contemplated.

As shown, memory 40 includes telephony drivers and application software 45 stored therein. It is noted that telephony drivers and application software 45 may be stored more permanently within storage 80 and during run time, at least portions of the instructions and data being executed by processor 30 may be loaded into memory 40.

Portable computer system 10 may be described in terms of including a computing subsystem and a wireless subsystem. In one embodiment, the computing subsystem may include the components that typically make up a computing platform. For example, the computing subsystem may include processor 30, memory 40, I/O unit 50, display 60 and so on. The wireless subsystem may include wireless module 70, which includes processing unit 71, memory 72, and LR display 65. As will be described in greater detail below, in one embodiment, portable computer system 10 may operate in various modes.

More particularly, during operation of portable computer system 10, either subsystem may be used alone, or both subsystems may be used together in various combinations. For example, in one mode, portable computer system 10 may operate such that only the wireless module 70 may be in operation while the computing subsystem components may be in a standby or low power state. As such, portable computer system 10 may be operated as a wireless communication device such as a mobile telephone or a personal digital assistant (PDA). In such an embodiment, LR display 65 may be used. In another mode, the wireless telephony subsystem may be turned off or placed in a standby mode and portable computer system 10 may operate simply as a laptop or notebook computer. In still other modes, portable computer system 10 may operate using various combinations of computing and wireless communication functionality. It is noted that while portable computer system 10 is operated in the different modes, one or more components may be powered down or placed in a standby mode or other low power states. As such, portable computer system 10 may include a power management unit (not shown) that may manage the different modes and power states and any switching therebetween.

Depending upon the application software and drivers that may be installed, portable computer system 10 may function as a laptop computer with a fully integrated wireless communication platform that includes voice and data transfer functionality. In addition, due to the integration of the wireless hardware and the telephony drivers and application software 45 on the portable computing platform, the management of various email, address books, and other files may be seamless to a user. For example, the telephony drivers and application software 45 may include instructions that may be used to configure the wireless module 70. In one implementation, a user may select a software driver through a control panel such as may be found in the Windows™ operating system by Microsoft Corp. The driver may configure one or more operational characteristics and/or behaviors of wireless module 70. In addition, the telephony drivers and application software 45 may be used to manage email, address books, phone lists, databases, calendars, and other information traditionally used on a mobile telephone. The application software may also include applications that may be run by processor 30 such as spreadsheet, word processing, games, and the like. Once the user configures the system operation, such operations as receiving incoming calls, sending outgoing calls, receiving and sending email, and display management may be fully automated from a platform user perspective.

In addition to the functionality described above, portable computer system 10 may be used as a remotely accessible server that may operate dependent upon user configurable system settings and commands received from a user calling or initiating a wireless connection via a datagram into the system. For example, in one embodiment, a user may place a call to the portable computer system 10 via the wireless subsystem and request that a file or other information be sent to the user via email. Depending on various user configurable system settings, the wireless subsystem may authenticate the caller using voice recognition, a password supplied via a telephone keypad and corresponding touch tones, or some other authentication scheme. Once the caller is authenticated, the user may request information such as a file using voice commands or the telephone keypad. In response, the wireless subsystem may send a request for the information. In one embodiment, the request may be sent to processor 30, which may initiate the sending of an email with the requested information attached. In other embodiments, the request may be sent to a DMA channel for retrieval of the information. In such an embodiment, the wireless module 70 may initiate the sending of the email with the requested information attached. In various embodiments, the email address may be predetermined or it may be selected from among a number of predetermined addresses in an address book, for example. In still other embodiments, the user may request the information. In response to the request, processor 30 may retrieve the information. However, processor 30 may execute voice synthesis application software that may synthesize the requested data into speech data that is played back to the user. In further embodiments, the user may be authenticated as an administrative-level user with administrative privileges. As such, the user may be allowed to perform administrative and system management tasks on computer system 10. In some embodiments, the computing subsystem may be in a low power mode when the call is received. As such, the computing subsystem may be "awakened" to a different mode or power state to process the request.

Figure 2:
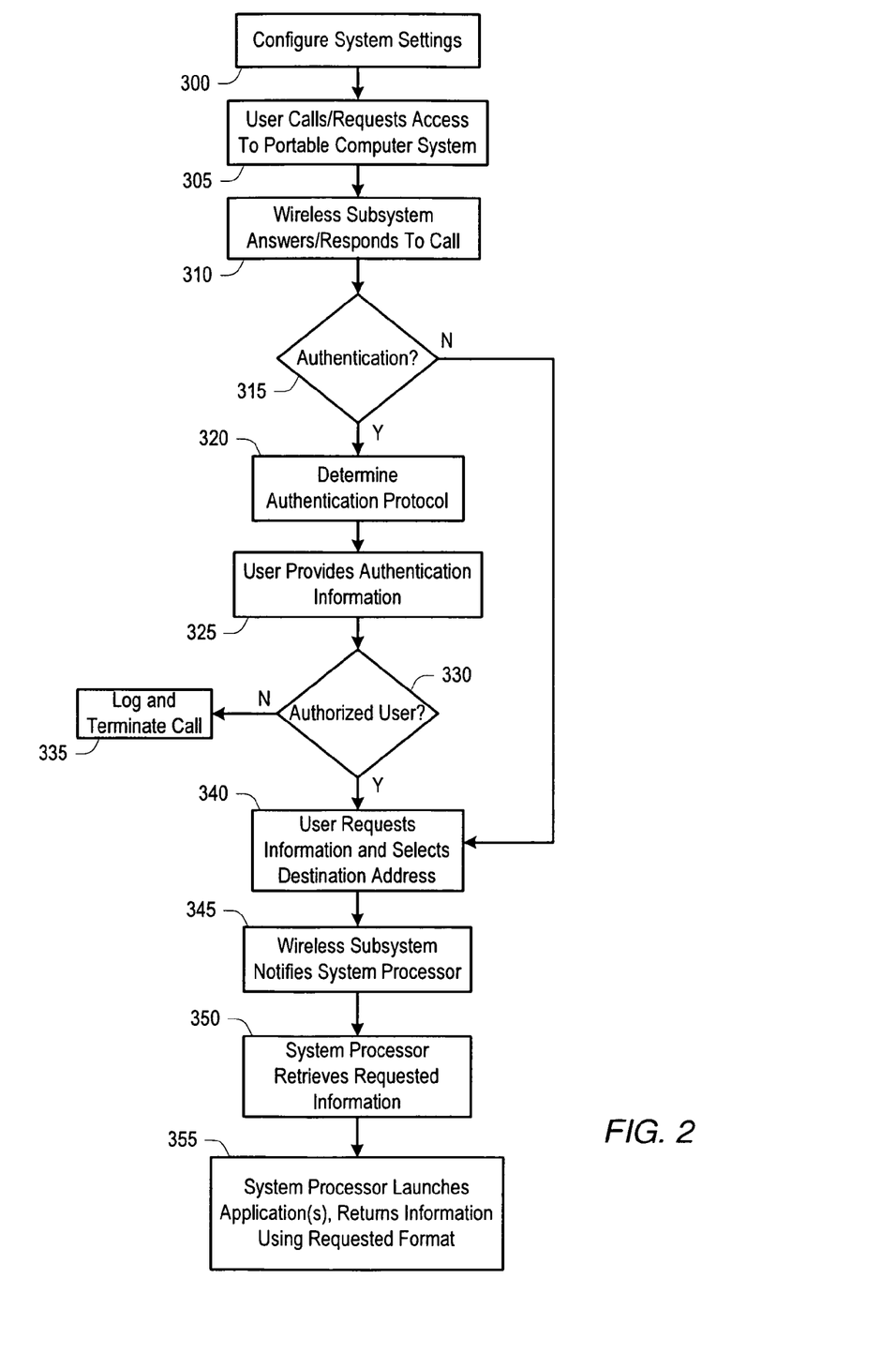
FIG. 2 is a flow diagram describing the operation of one embodiment of the portable computer system of FIG. 1.

FIG. 2, is a flow diagram describing the operation of the embodiment of the portable computer system shown in FIG. 1. Referring collectively to FIG. 1 and FIG. 2, beginning in block 300, a user may configure server operation of portable computer system 10 by selecting one or more drivers. For example, passwords may be entered and stored, email address selections may be entered, voice recordings may be made, and so on. More particularly, there may be many commands associated with the retrieval and sending of the information. In addition, destination addresses may be entered into a database for later selection. As described further below, the commands may be processed via voice recognition or through tone demodulation. As such, the various commands may be recorded by the user and stored for later use.

Once the system settings have been configured, portable computer system 10 may be allowed to go into a low power state, as desired. At some point, a user may send a datagram or dial a telephone number assigned to portable computer system 10 (block 305). The wireless module 70 may automatically (without processor 30 intervention) answer the incoming call or respond to an incoming datagram (block 310). In one embodiment, the user may press one or more buttons to activate a server mode. Alternatively, the user/caller may give a voice command that may be recognized by the wireless subsystem. Accordingly, in one embodiment, processing module 71 may determine whether authentication is required (block 315). In one embodiment, processing unit 71 may check the system settings that may be stored within a register set, for example. If the processing unit 71 determines that authentication is necessary, processing unit 71 may then determine the authentication protocol (block 320). For example, the system settings may indicate that voice recognition may be used for authentication. As such, the user may be prompted to say a specific word or words (325). Alternatively, the system settings may indicate that a text password may be entered via the keypad on the callers end. Processing unit 71 may then determine if the user is an authorized user based upon whether a voice match was obtained or the password is correct (block 330). In another embodiment, processing unit 71 may send the information corresponding to the voice data to processor 30, which may perform the voice recognition. Referring back to block 315, if user authentication is not required, operation may proceed as described below in block 340.

If the caller is not a an authorized user (block 330), in one embodiment, processing unit 71 may enter the failed validation in a log file and then terminate the telephone call (335). In other embodiments, the processing unit 71 may simply terminate the call. However, if the user is a valid user (block 330), the user may be notified that the authentication was successful and prompted for a command. As such, the user may request a file or other information using predetermined voice commands. In another embodiment, the user may be prompted with a menu from which the caller may make selections with the keypad. The user may further specify or select a destination address from one or more addresses (block 340).

As mentioned above, in one embodiment, processor 71 may notify processor 30 of the request and the destination address (block 345). Processor 30 may then retrieve the requested information or cause it to be retrieved via DMA cycles, for example, from storage 80 (block 350). Once the information is being retrieved, processor 30 may format and return the information to the user in the requested format. For example, processor 30 may be configured to launch the email application software, and initiate an email to the destination address. The requested information may be attached to the email in any of a variety of formats (e.g., text file, graphics, video, portable document format (pdf), etc.) or it may be included in the body of the email, as desired. The email may then be sent to the destination address via the wireless telephony subsystem. It is noted that in an alternative embodiment, the email may be sent via a local network connection such as through hardwired network communication link such as an Ethernet link, for example. In addition, processor 30 may execute voice synthesis application software that may synthesize the retrieved data into speech data that may be played back as audio for the user. Processor 30 may also return the requested information via streaming data (multimedia or otherwise). Further, the user may request the system perform other tasks such as executing a script file, launching a multimedia recording session, for example (block 355).

Figure 3A:
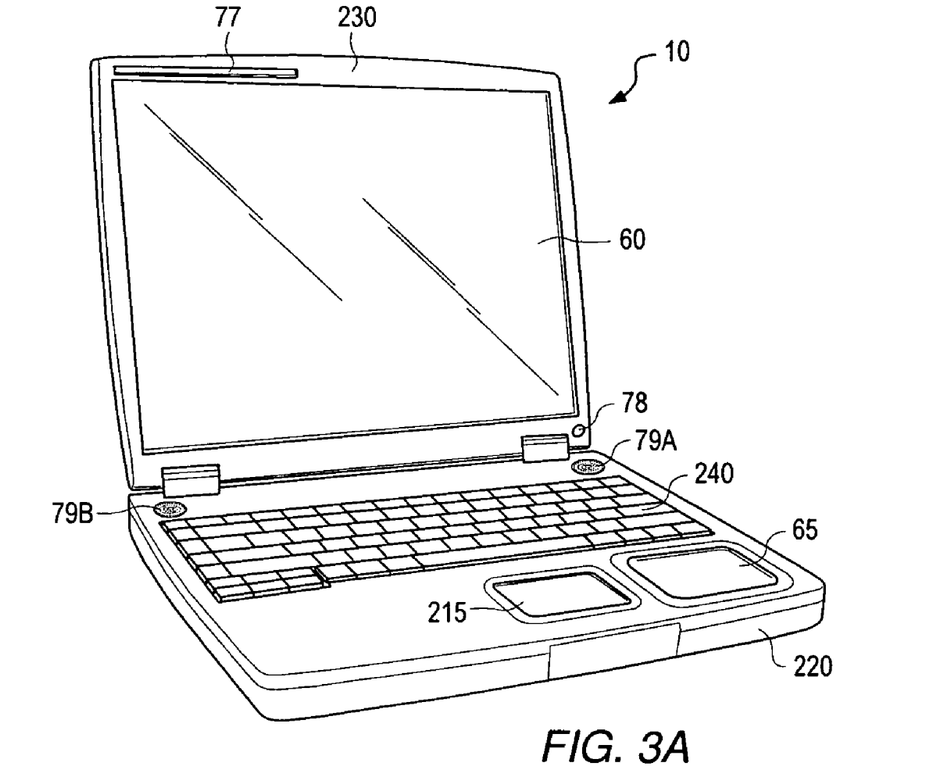
FIG. 3A is a perspective view drawing of one embodiment of the portable computer system of FIG. 1.
Figure 3B:
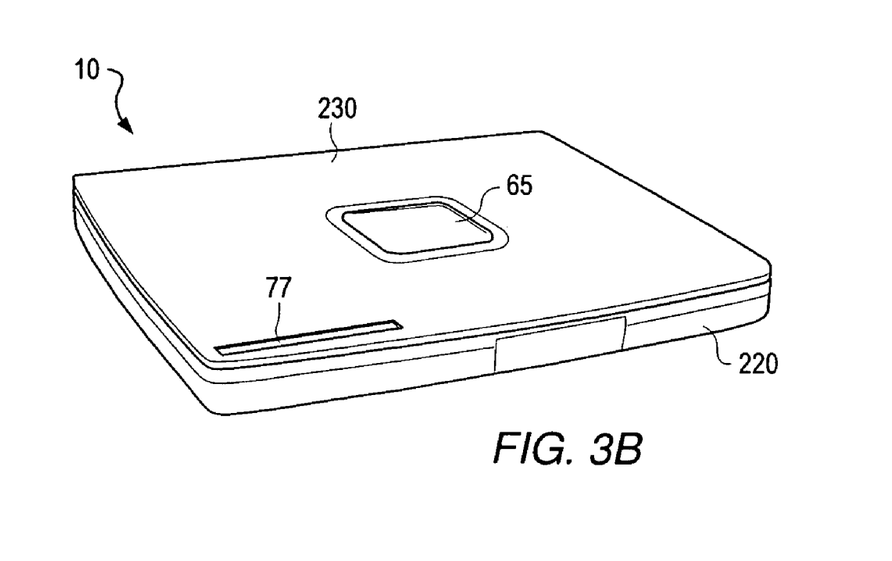
FIG. 3B is a perspective view drawing of another embodiment of the portable computer system of FIG. 1.

FIG. 3A and FIG. 3B are perspective view drawings of exemplary embodiments of the portable computer system including wireless telephony shown in FIG. 1. FIG. 3A depicts the portable computer system 10 as a laptop computer (i.e., a notebook computer) that includes a housing 220 with a hingably attached cover 230 that is in an open position. FIG. 3B depicts another embodiment of the portable computer system 10 with cover 230 in a closed position.

Referring to FIG. 3A, the cover 230 includes a display such as an LCD, microelectro-mechanical (MEMS), or electronic ink (Eink), for example, that forms a part of the internal surface of the cover. In addition, in the illustrated embodiment, portable computer system 10 includes an antenna 77 that is mounted to cover 230. It is noted that the mounting location, type, and numbers of antenna 77 are implementation details. Accordingly, although antenna 77 is shown mounted to the inside of cover 230, in other embodiments, antenna 77 may be mounted to cover 230 or housing 220, or even internal to housing 220 as desired. In addition, antenna 77 may go entirely or partially around display 60.

Portable computer system 10 also includes a microphone 78, speakers 79A and 79B, and a keyboard 240, and a touch activated mouse control 215 that are mounted on a top surface of the housing 220. In addition, portable computer system 10 includes an additional display unit (e.g., LR display 65) mounted to the top surface of housing 220. As described above, in one embodiment, display 65 may be a low-resolution display. In various other embodiments, LR display 65 may also be an input device (e.g., touch-activated screen) to facilitate use of a pointing device such as a stylus, for example. As such, LR display 65 may include analog-to-digital conversion circuits to input data from the screen. It is noted that the location of LR display 65 is an implementation detail. As such, LR display 65 may be located in any desired location such as that shown in FIG. 3B, for example.

Referring to FIG. 3B, the embodiment of portable computer system 10 shown in FIG. 3B is similar to the embodiment shown in FIG. 3A. However, the embodiment of portable computer system 10 shown in FIG. 3B does not include LR display 65 mounted on the top surface of housing 220. Instead, as illustrated in FIG. 3B, LR display 65 is mounted on the external surface of cover 230 such that LR display 65 is visible and useable when cover 230 is in the closed position. In addition, as noted above, in the illustrated embodiment, antenna 77 is mounted on the external surface of cover 430, but may be mounted internal to housing 420, or any other location, as desired.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A laptop computer system comprising:
   a computing subsystem comprising:
   a processor configured to execute instructions that implement application software;
   a storage coupled to the processor and configured to store information;
   wherein the computing subsystem is configured to operate in a normal mode and a server mode; and
   a wireless subsystem coupled to the computing subsystem, wherein the wireless subsystem is configured to communicate with a wireless network and to receive an incoming communication via the wireless network, wherein the incoming communication includes a request for at least a portion of the information in the storage;
   wherein the wireless subsystem is further configured notify the processor in response to determining the request is from an authorized user;
   wherein in response to being notified by the wireless subsystem, the processor is further configured to:
      place the computing subsystem into the server mode of operation;
      retrieve the at least a portion of the information from the storage; and
      send the at least a portion of the information to a destination specified in the request; and
   wherein the wireless subsystem is further configured to identify whether the authorized user has administrative privileges.

2. The laptop computer system as recited in claim 1, wherein the processor is configured to terminate the communication and to retrieve no information if the wireless subsystem has determined that the request is not from an authorized user.

3. The laptop computer system as recited in claim 1, wherein the wireless subsystem is configured to perform functions associated with digital signal processing of audio signals.

4. The laptop computer system as recited in claim 3, wherein the wireless subsystem is configured to determine whether a request is from an authorized user using voice recognition.

5. The laptop computer system as recited in claim 3, wherein the wireless subsystem is configured to determine whether a request is from authorized user using tone demodulation.

6. The laptop computer system as recited in claim 1, wherein the processor is configured to send the at least a portion of the information to a destination address specified in the request using email.

7. The laptop computer system as recited in claim 1, wherein the processor is configured to synthesize the at least a portion of the information into voice data, and the wireless subsystem is further configured to send the voice data as audio.

8. A laptop computer system comprising:
   a computing subsystem comprising:
   a processor configured to execute instructions that implement application software;
   a storage coupled to the processor and configured to store information;
   wherein the computing subsystem is configured to operate in normal mode and a server mode; and
   a wireless subsystem coupled to the computing subsystem, wherein the wireless subsystem is configured to communicate with a wireless network and to receive an incoming communication via the wireless network, wherein the incoming communication includes a request for at least a portion of the information in the storage;
   wherein the wireless subsystem is further configured notify the processor in response to determining the request is from an authorized user;
   wherein wireless subsystem includes a processing unit having a second processor that is configured to execute instructions to determine whether voice data in the request matches voice data of an authorized user; and wherein in response to being notified by the wireless subsystem, the processor is further configured to:
   place the computing subsystem into the server mode of operation;
   retrieve the at least a portion of the information from the storage; and
   send the at least a portion of the information to a destination specified in the request.

9. A laptop computer system comprising:
a computing subsystem comprising:
   a processor configured to execute instructions that implement application software;
   a storage coupled to the processor and configured to store information;
   wherein the computing subsystem is configured to operate in normal mode and a server mode; and
a wireless subsystem coupled to the computing subsystem, wherein the wireless subsystem is configured to communicate with a wireless network and to receive an incoming communication via the wireless network, wherein the incoming communication includes a request for at least a portion of the information in the storage;
wherein the wireless subsystem is further configured notify the processor in response to determining the request is from an authorized user;
wherein wireless subsystem is configured to identify whether the request is from an authorized user by providing voice data in the request to the processor of the computing system; and
wherein in response to being notified by the wireless subsystem, the processor is further configured to:
   place the computing subsystem into the server mode of operation;
   retrieve the at least a portion of the information from the storage; and
   send the at least a portion of the information to a destination specified in the request.

10. The laptop computer system as recited in claim 9, wherein the processor is configured to execute instructions to determine whether the voice data in the request matches voice data of an authorized user.

11. The laptop computer system as recited in claim 1, wherein the incoming communication comprises a telephone call.

12. The laptop computer system as recited in claim 1, wherein the incoming communication comprises a datagram.

13. A laptop computer system comprising:
a processor configured to execute instructions that implement application software;
a storage coupled to the processor and configured to store information; and
a wireless module configured to communicate with a wireless network;
wherein the wireless module is further configured to receive an incoming communication via the wireless network, and to notify the processor in response to determining the incoming communication is from an authorized user; and
wherein the incoming communication includes a request for at least a portion of the information in the storage;

wherein in response to being notified by the wireless module, the processor is configured to:
   operate in a server mode of operation;
   retrieve the at least a portion of the information from the storage; and
   send the at least a portion of the information to a destination specified in the request; and
wherein the wireless module is further configured to identify whether the authorized user has administrative privileges.

14. The laptop computer system as recited in claim 13, wherein the processor is configured to terminate the communication and to retrieve no information if the wireless module has determined that the request is not from an authorized user.

15. The laptop computer system as recited in claim 13, wherein the wireless module is configured to perform functions associated with digital signal processing of audio signals.

16. A laptop computer system comprising:
a processor configured to execute instructions that implement application software;
a storage coupled to the processor and configured to store information; and
a wireless module configured to communicate with a wireless network;
wherein the wireless module is further configured to receive an incoming communication via the wireless network, and to notify the processor in response to determining the incoming communication is from an authorized user; and
wherein the incoming communication includes a request for at least a portion of the information in the storage;
wherein in response to being notified by the wireless module, the processor is configured to:
   operate in a server mode of operation;
   retrieve the at least a portion of the information from the storage; and
   send the at least a portion of the information to a destination specified in the request; and
wherein the wireless module is configured to perform functions associated with digital signal processing of audio signals on voice data included in the request.

17. The laptop computer system as recited in claim 16, wherein wireless module includes a processing unit having a second processor that is configured to execute instructions to determine whether the voice data in the request matches voice data of an authorized user.

18. The laptop computer system as recited in claim 13, wherein the processor is configured to send the at least a portion of the information to a destination address specified in the request using email.

19. The laptop computer system as recited in claim 13, wherein the processor is configured to synthesize the at least a portion of the information into voice data, and the wireless module is further configured to send the voice data as audio.

20. The laptop computer system as recited in claim 13, wherein in response to identifying that the requesting is from an authorized user having administrative privileges, the wireless module is configured to process additional requests from the requesting user to perform system management tasks.

* * * * *

UNITED STATES PATENT AND TRADEMARK OFFICE
CERTIFICATE OF CORRECTION

PATENT NO.        : 7,890,138 B2                                  Page 1 of 1
APPLICATION NO.   : 11/478771
DATED             : February 15, 2011
INVENTOR(S)       : R. Stephen Polzin and William T. Edwards It is certified that error appears in the above-identified patent and that said Letters Patent is hereby corrected as shown below:

In the Claims:

Claim 9, col. 9, line 18, please change "in normal mode" to "in a normal mode".
Claim 9, col. 9, line 29, please change "wherein wireless" to "wherein the wireless".
Claim 17, col. 10, line 45, please change "wherein wireless" to "wherein the wireless".
Claim 20, col. 10, line 58, please change "the requesting" to "the request".
Claim 20, col. 10, line 61, please change "the requesting user" to "the authorized user".

Signed and Sealed this
Thirty-first Day of May, 2011

David J. Kappos
*Director of the United States Patent and Trademark Office*